(12) United States Patent
Quach et al.

(10) Patent No.: US 11,339,667 B2
(45) Date of Patent: May 24, 2022

(54) COOLING ARRANGEMENT INCLUDING OVERLAPPING DIFFUSERS

(71) Applicant: Raytheon Technologies Corporation, Farmington, CT (US)

(72) Inventors: San Quach, Southington, CT (US); Bryan P. Dube, Columbia, CT (US); Tracy A. Propheter-Hinckley, Rocky Hill, CT (US); Allan N. Arisi, Rocky Hill, CT (US); Adam P. Generale, Dobbs Ferry, NY (US); Lucas Dvorozniak, Bloomfield, CT (US); Howard J. Liles, Newington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/990,420

(22) Filed: Aug. 11, 2020

(65) Prior Publication Data
US 2022/0049608 A1    Feb. 17, 2022

(51) Int. Cl.
*F01D 5/18* (2006.01)
*F01D 5/28* (2006.01)

(52) U.S. Cl.
CPC ............. *F01D 5/186* (2013.01); *F01D 5/282* (2013.01); *F05D 2240/55* (2013.01);
(Continued)

(58) Field of Classification Search
CPC ............... F01D 5/18; F01D 5/186; F01D 9/06
(Continued)

(56) References Cited

U.S. PATENT DOCUMENTS 4,529,358 A    7/1985 Papell
4,726,735 A    2/1988 Field et al.
(Continued)

FOREIGN PATENT DOCUMENTS

CN    106640216    5/2017
EP    3034794    6/2016
(Continued)

OTHER PUBLICATIONS

Haven, B.A., Yamagata, D.K., Kurosaka, M., Yamawaki, S., and Maya, T. (1997). Anti-kidney pair of vortices in shaped holes and their influence on film cooling effectiveness. ASME. Presented at the International Gas Turbine & Aeroengine Congress & Exhibition. Orlando, Florida. Jun. 2-5, 1997. pp. 1-8.
(Continued)

*Primary Examiner* — Christopher Verdier
*Assistant Examiner* — Cameron A Corday
(74) *Attorney, Agent, or Firm* — Carlson, Gaskey & Olds, P.C.

(57) ABSTRACT

A gas turbine engine component according to an example of the present disclosure includes a wall extending in a thickness direction between first and second wall surfaces. The first wall surface bounds an internal cavity. The wall includes a plurality of cooling passages. Each of the cooling passages extend in a first direction between an inlet port and an outlet port coupled to a respective diffuser, and the inlet port coupled to the internal cavity along the first wall surface. Sidewalls of adjacent diffusers are conjoined to establish a common diffuser region interconnecting the diffusers and a common outlet along the second wall surface. A method of cooling a gas turbine engine component is also disclosed.

20 Claims, 15 Drawing Sheets

(52) U.S. Cl.
CPC .... *F05D 2240/80* (2013.01); *F05D 2260/202* (2013.01); *F05D 2260/232* (2013.01); *F05D 2300/6033* (2013.01)

(58) Field of Classification Search
USPC ........................................................ 416/97 R
See application file for complete search history.

(56) References Cited

U.S. PATENT DOCUMENTS

| | | |
|---|---|---|
| 4,992,025 A | 2/1991 | Stroud et al. |
| 5,062,768 A | 11/1991 | Marriage |
| 5,419,681 A | 5/1995 | Lee |
| 7,328,580 B2 | 2/2008 | Lee et al. |
| 7,563,073 B1 | 7/2009 | Liang |
| 7,883,320 B2 | 2/2011 | Pietraszkiewicz et al. |
| 7,997,868 B1 | 8/2011 | Liang |
| 8,092,177 B2 | 1/2012 | Liang |
| 8,522,558 B1 | 9/2013 | Xu |
| 8,683,813 B2 | 4/2014 | Xu et al. |
| 8,707,713 B2 | 4/2014 | Levasseur et al. |
| 8,978,390 B2 | 3/2015 | Levasseur et al. |
| 10,030,525 B2 | 7/2018 | Bergholz |
| 2008/0003096 A1 | 1/2008 | Kohli et al. |
| 2013/0205787 A1 | 8/2013 | Zelesky et al. |
| 2013/0205802 A1 | 8/2013 | Levasseur et al. |
| 2013/0205803 A1* | 8/2013 | Xu .......................... F01D 5/186 60/806 |
| 2013/0206739 A1 | 8/2013 | Reed et al. |
| 2013/0209236 A1 | 8/2013 | Xu |
| 2015/0377033 A1 | 12/2015 | Xu |
| 2016/0003054 A1 | 1/2016 | Dierberger |
| 2016/0169004 A1 | 6/2016 | Quach et al. |
| 2016/0201474 A1 | 7/2016 | Slavens et al. |
| 2016/0273364 A1* | 9/2016 | Bergholz ................ F01D 5/186 |
| 2017/0089579 A1 | 3/2017 | Bunker et al. |
| 2017/0101870 A1 | 4/2017 | Lewis |
| 2017/0328214 A1 | 11/2017 | Odemondo |
| 2017/0335691 A1 | 11/2017 | Crites et al. |

FOREIGN PATENT DOCUMENTS

| | | |
|---|---|---|
| EP | 3249160 | 11/2017 |
| EP | 2912276 | 3/2018 |
| EP | 3354853 | 8/2018 |
| KR | 20130041893 | 4/2013 |

OTHER PUBLICATIONS

European Search Report for European Patent Application No. 19181025.8 completed Oct. 8, 2019.
European Search Report for European Patent Application No. 21189710.3 dated Jan. 11, 2022.

* cited by examiner

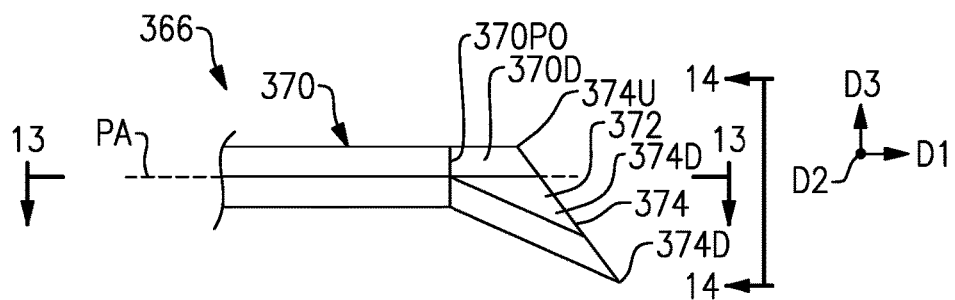
FIG.12
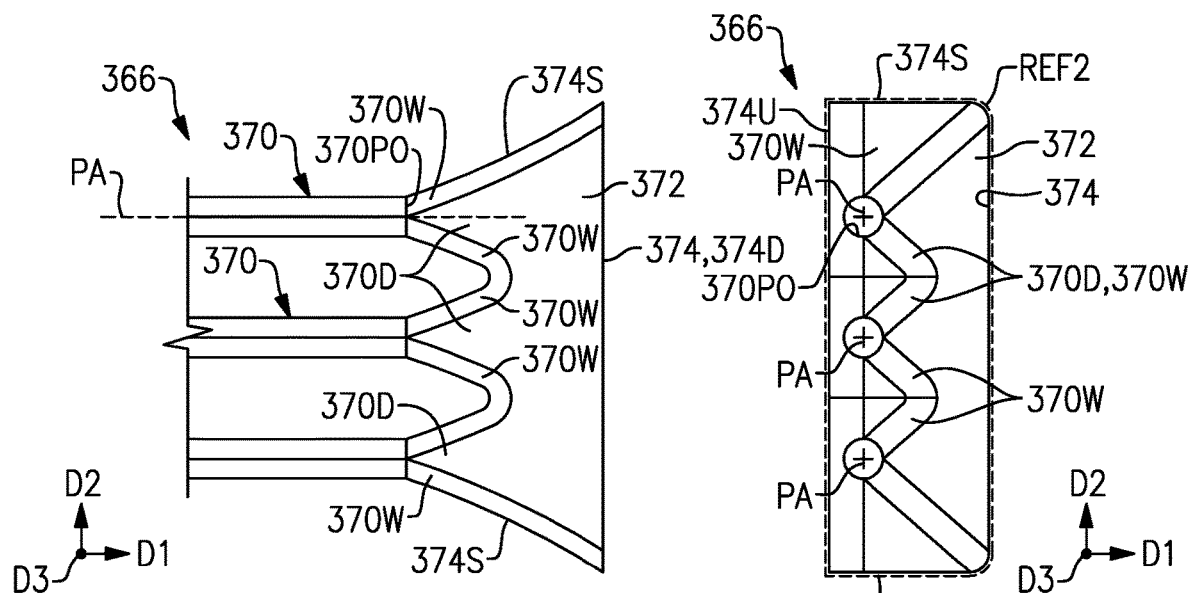
FIG.13
FIG.14
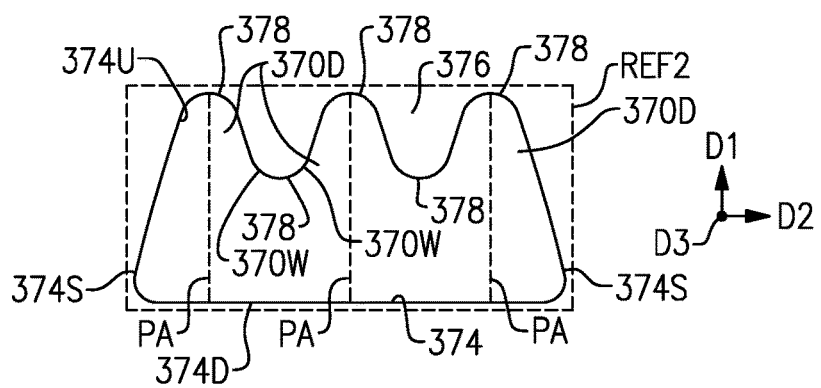
FIG.15

COOLING ARRANGEMENT INCLUDING OVERLAPPING DIFFUSERS

BACKGROUND

This disclosure relates to cooling for a component, such as a component of a gas turbine engine.

Gas turbine engines can include a fan for propulsion air and to cool components. The fan also delivers air into a core engine where it is compressed. The compressed air is then delivered into a combustion section, where it is mixed with fuel and ignited. The combustion gas expands downstream over and drives turbine blades. Static vanes are positioned adjacent to the turbine blades to control the flow of the products of combustion. The blades and vanes are subject to extreme heat, and thus cooling schemes are utilized for each.

Some cooling schemes may employ discrete diffusion cooling holes to communicate diffused cooling flow to adjacent portions of the blades or vanes.

SUMMARY

A gas turbine engine component according to an example of the present disclosure includes a wall extending in a thickness direction between first and second wall surfaces. The first wall surface bounds an internal cavity. The wall includes a plurality of cooling passages. Each of the cooling passages extend in a first direction between an inlet port and an outlet port coupled to a respective diffuser, and the inlet port coupled to the internal cavity along the first wall surface. Sidewalls of adjacent diffusers are conjoined to establish a common diffuser region interconnecting the diffusers and a common outlet along the second wall surface. Each of the cooling passages has a minimum cross-sectional area, a total of the minimum cross-sectional area of all of the cooling passages establishes a combined cross-sectional area, the common outlet establishes an outlet cross-sectional area, and an area ratio of the combined cross-sectional area to the outlet cross-sectional area is equal to or greater than 0.15, and the area ratio is less than or equal to 0.40.

In a further embodiment of any of the foregoing embodiments, the plurality of cooling passages includes at least three cooling passages distributed in a second direction perpendicular to the first direction and the thickness direction.

In a further embodiment of any of the foregoing embodiments, adjacent inlet ports establish a pitch, and a pitch ratio of an average of the pitch of the inlet ports to a maximum width of the common outlet is equal to or greater than 0.10, and the pitch ratio is less than or equal to 0.30.

In a further embodiment of any of the foregoing embodiments, the cooling passages are arranged such that a projection of the passage axis is non-orthogonal to a reference plane along the common outlet.

In a further embodiment of any of the foregoing embodiments, the common outlet extends in the first direction between an upstream edge and a downstream edge and extends in the second direction between a pair of opposed sidewalls. The diffuser is offset from at least one adjacent diffuser with respect to the first direction such that the downstream edge has a non-linear geometry.

In a further embodiment of any of the foregoing embodiments, the common outlet extends in the first direction between an upstream edge and a downstream edge and extends in the second direction between a pair of opposed sidewalls, and the downstream edge includes a plurality of undulations.

In a further embodiment of any of the foregoing embodiments, the cooling passages are distributed in a second direction perpendicular to the first direction, and the inlet port of at least one of the cooling passages is offset from the respective outlet port with respect to the second direction.

In a further embodiment of any of the foregoing embodiments, the passage axes of all of the plurality of cooling passages coupled to the common outlet are parallel to each other.

In a further embodiment of any of the foregoing embodiments, a projection of the passage axis of one of the plurality of cooling passages is substantially parallel to a sidewall of the common diffuser region.

In a further embodiment of any of the foregoing embodiments, the passage axes of at least two of the cooling passages are transversely arranged relative to each other.

In a further embodiment of any of the foregoing embodiments, the inlet ports of the at least two cooling passages are conjoined to establish a common inlet.

In a further embodiment of any of the foregoing embodiments, the gas turbine engine component is an airfoil comprising a ceramic matrix composite (CMC) material, the airfoil including an airfoil section extending from a platform, and the second wall surface is an external wall surface of the airfoil section.

A gas turbine engine according to an example of the present disclosure includes an array of blades and an array of vanes spaced axially from the array of blades in a gas path. The array of blades is rotatable in the gas path, and an array of blade outer air seals (BOAS) are arranged about the array of blades to bound the gas path. The array of vanes and the array of BOAS include an external wall between an internal wall surface and an external wall surface, the internal wall surface bounding an internal cavity. A plurality of cooling passages in the external wall includes an intermediate section extending between an inlet port and an outlet port coupled to a respective diffuser, and the inlet port coupled to the internal cavity along the internal wall surface. The diffusion sections are conjoined to establish a common diffuser region interconnecting the diffusers and a common outlet along the external wall surface. Each of the cooling passages has a minimum cross-sectional area. A total of the minimum cross-sectional area of all of the cooling passages establishes a combined cross-sectional area. The common outlet establishes an outlet cross-sectional area, and an area ratio of the combined cross-sectional area to the outlet cross-sectional area is equal to or greater than 0.15, and the area ratio is less than or equal to 0.40.

In a further embodiment of any of the foregoing embodiments, adjacent inlet ports establish a pitch, a pitch ratio of an average of the pitch of the inlet ports to a maximum width of the common outlet is equal to or greater than 0.10, and the pitch ratio is less than or equal to 0.30.

In a further embodiment of any of the foregoing embodiments, the plurality of cooling passages includes three or more cooling passages distributed in a radial direction, and the diffusers are arranged in a chordwise direction to establish a cascade along the external wall surface such that the outlet ports are offset in the chordwise direction.

In a further embodiment of any of the foregoing embodiments, an airfoil section comprises the external wall, the airfoil section extends in a radial direction from a platform, and the cooling passages are distributed such that each inlet port is offset from the respective outlet port with respect to the radial direction.

A method of cooling a gas turbine engine component according to an example of the present disclosure includes communicating cooling flow from an internal cavity to a plurality of cooling passages. The internal cavity is bounded by an external wall of the gas turbine engine component, and each of the plurality of cooling passages is coupled to an inlet port along an internal wall surface bounding the internal cavity. The method includes communicating cooling flow from the cooling passages to respective diffuser. The diffusers are conjoined to establish a common diffuser region interconnecting the diffusers and a common outlet along an external wall surface of the external wall. The method includes ejecting cooling flow from the common outlet and into a gas path to provide film cooling augmentation to the external wall surface. Each of the cooling passages has a minimum cross-sectional area. A total of the minimum cross-sectional area of all of the cooling passages establishes a combined cross-sectional area. The common outlet establishes an outlet cross-sectional area, and an area ratio of the combined cross-sectional area to the outlet cross-sectional area is equal to or greater than 0.15, and the area ratio is less than or equal to 0.40.

In a further embodiment of any of the foregoing embodiments, the plurality of cooling passages includes three or more cooling passages. The diffusers are arranged in a cascade along the external wall surface, and adjacent inlet ports establish a pitch. A pitch ratio of an average of the pitch of the inlet ports to a maximum width of the common outlet is equal to or greater than 0.10, and the pitch ratio is less than or equal to 0.30.

In a further embodiment of any of the foregoing embodiments, an airfoil section comprises the external wall. The airfoil section extends in a radial direction from a platform. Each of the cooling passages is coupled to the respective diffuser at a respective outlet port, and the cooling passages are distributed such that one or more of the inlet ports is offset from the respective outlet port with respect to the radial direction.

In a further embodiment of any of the foregoing embodiments, the plurality of cooling passages includes three or more cooling passages, and the inlet ports of the three or more cooling passages are conjoined to establish a common inlet.

The various features and advantages of this invention will become apparent to those skilled in the art from the following detailed description of an embodiment. The drawings that accompany the detailed description can be briefly described as follows.

BRIEF DESCRIPTION OF THE DRAWINGS

FIG. 12 illustrates a sectional view of the cooling arrangement of FIG. 11.
FIG. 13 illustrates a sectional view taken along line 13-13 of FIG. 12.
FIG. 14 illustrates an end view taken with respect to line 14-14 of FIG. 12.
FIG. 15 illustrates a perspective view of a volume of the cooling arrangement of FIG. 11.

DETAILED DESCRIPTION

Figure 1:
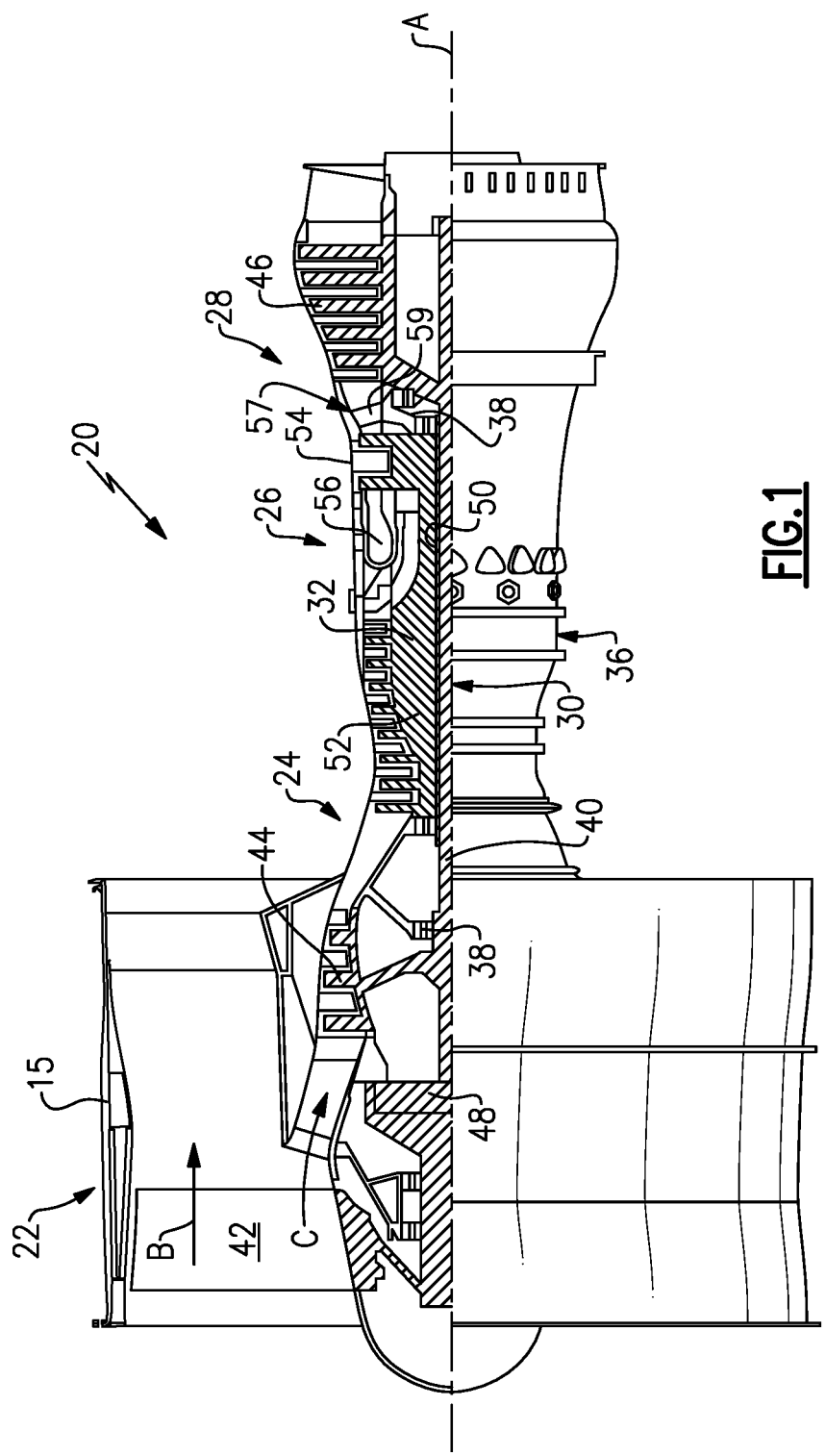
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
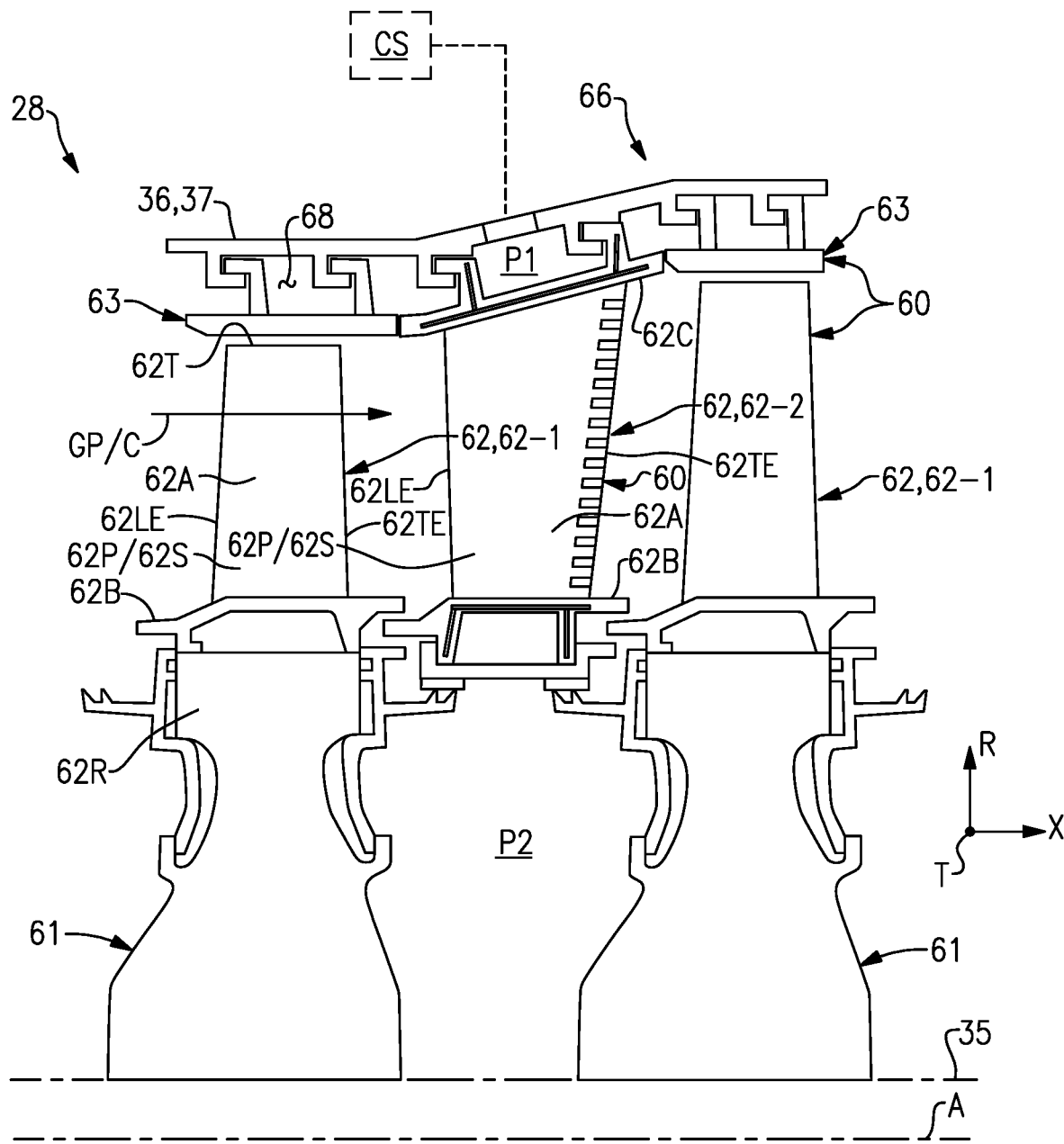
FIG. 2 schematically shows an airfoil arrangement.

FIG. 2 illustrates an exemplary section of a gas turbine engine, such as the turbine section 28 of FIG. 1. Although the disclosure primarily refers to the turbine section 28, it should be understood that other portions of the engine 20 can benefit from the teachings disclosed herein, including airfoils in the compressor section 24 and combustor panels or liners in the combustor section 26, and other portions of the engine 20 that may be subject to elevated temperature conditions during engine operation. Other systems can benefit from the teachings disclosed herein, including gas turbine engines and other systems lacking a fan for propulsion. In this disclosure, like reference numerals designate like elements where appropriate and reference numerals with the addition of one-hundred or multiples thereof designate modified elements that are understood to incorporate the same features and benefits of the corresponding original elements.

The turbine section 28 includes a plurality of components 60 arranged relative to the engine axis A, including a rotor 61, one or more airfoils 62, and one or more blade outer air seals (BOAS) 63. Example airfoils 62 include blades 62-1 and vanes 62-2. The rotor 61 is coupled to a rotatable shaft 35 (shown in dashed lines for illustrative purposes). The shaft 35 can be one of the shafts 40, 50 of FIG. 1, for example. The rotor 61 carries one or more blades 62-1 that are rotatable about the engine axis A in a gas path GP, such as the core flow path C.

Each airfoil 62 includes an airfoil section 62A extending in a spanwise or radial direction R from a first platform 62B. In the illustrative example of FIG. 2, each blade 62-1 extends in the radial direction R from the platform 62B to a tip 62T, and each vane 62-2 extends in the radial direction R from the first (e.g., inner) platform 62B to a second (e.g., outer) platform 62C. The platforms 62B, 62C bound or define a portion of the gas path GP. The airfoil section 62A generally extends in a chordwise or axial direction X between a leading edge 62LE and a trailing edge 62TE, and extends in a circumferential or thickness direction T between pressure and suction sides 62P, 62S. The pressure and suction sides 62P, 62S are joined at the leading and trailing edges 62LE, 62TE. The root section 62R of the blade 62-1 is mounted to, or integrally formed with, the rotor 61. The vane 62-2 can be arranged to direct or guide flow in the gas path GP from and/or towards the adjacent blade(s) 62-1.

Each BOAS 63 can be spaced radially outward from the tip 62T of the blade 62-1. The BOAS 63 can include an array of seal arc segments that are circumferentially distributed or arranged in an annulus about an array of the airfoils 62 to bound the gas path GP.

The turbine section 28 includes at least one array of airfoils 62, including at least one array of blades 62-1 and at least one array of vanes 62-2, and at least one array of BOAS 63 arranged circumferentially about the engine axis A. The array of vanes 62-2 are spaced axially from the array of blades 62-1 relative to the engine axis A. The tips 62T of the blades 62-1 and adjacent BOAS 63 are arranged in close radial proximity to reduce the amount of gas flow that escapes around the tips 62T through a corresponding clearance gap.

The turbine section 28 includes a cooling arrangement 66 for providing cooling augmentation to the components 60 during engine operation. The cooling arrangement 66 includes one or more cooling cavities or plenums P1, P2 defined by a portion of the engine static structure 36 such as the engine case 37. The plenum P2 can be at least partially defined or bounded by a rotatable portion of the engine 20, such as the rotor 61. One or more cooling sources CS (one shown) are configured to provide cooling air to the plenums P1, P2. The plenums P1, P2 are configured to receive pressurized cooling flow from the cooling source(s) CS to cool portions of the airfoils 62 and/or BOAS 63. Cooling sources CS can include bleed air from an upstream stage of the compressor section 24 (FIG. 1), bypass air, or a secondary cooling system aboard the aircraft, for example. Each of the plenums P1, P2 can extend in a circumferential or thickness direction T between adjacent airfoils 62 and/or BOAS 63.

Figure 3:
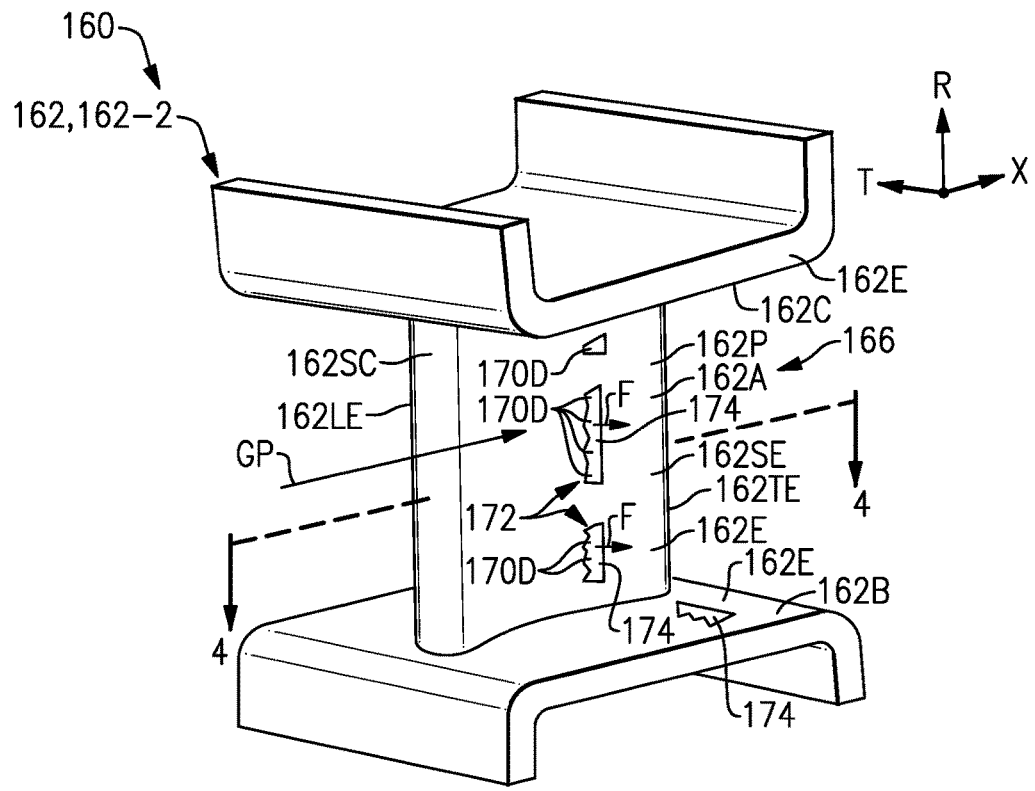
FIG. 3 illustrates a perspective view of an exemplary component.
Figure 4:
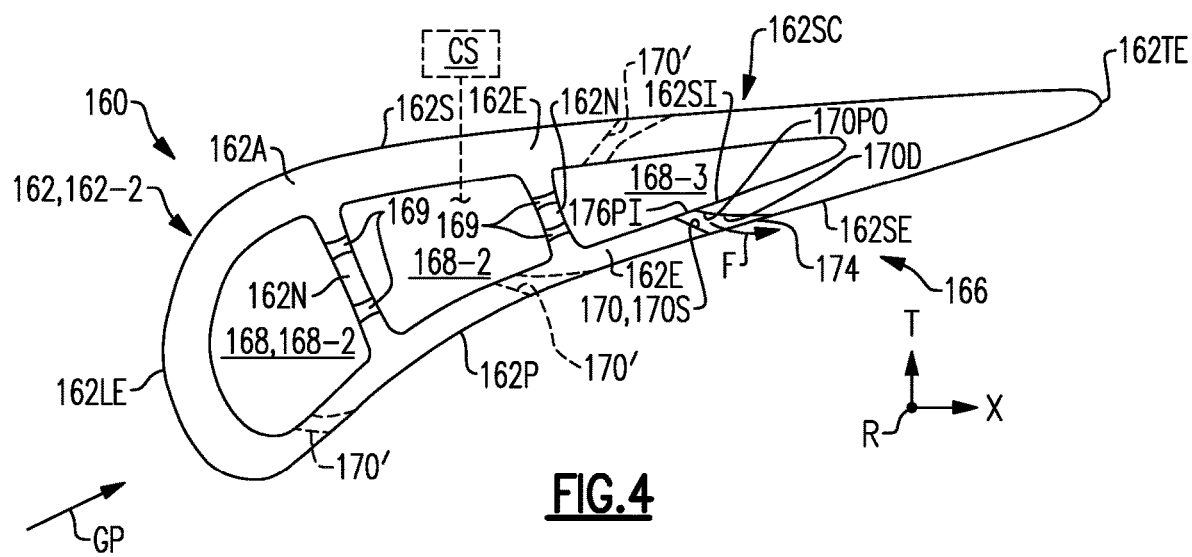
FIG. 4 illustrates a sectional view taken along line 4-4 of FIG. 3.

FIGS. 3-4 illustrate an exemplary gas turbine engine component 160 including a cooling arrangement 166. The component 160 can be a combustion liner incorporated into the combustor section 26, or a BOAS 63 or airfoil 62 such as a blade 62-1 or vane 62-2 incorporated into the turbine section 28 of FIG. 1, for example. In the illustrative example of FIGS. 3-4, the component 160 is an airfoil 162 shown as a vane 162-2. The vane 162-2 can be a turbine vane incorporated into one or more rows of the turbine section 28 or the mid-turbine frame 57 of FIG. 1, for example.

The airfoil 162 can include one or more external walls 162E and one or more internal walls 162N (FIG. 4) defined within a thickness of an airfoil section 162A. Surfaces along the external walls 162E of platforms 162B, 162C and the airfoil section 162A establish an external surface contour 162SC that interacts with gases in a gas path GP during operation.

The component 160 can be made of various materials. Example materials include metallic materials such as a high temperature metal or alloy including a nickel-based superalloy, or a composite material. Single crystal and directionally solidified metallic materials can be utilized. The component 160 can be made of a ceramic or ceramic matrix composite (CMC) material formed from one or more layers L of a CMC layup.

Referring to FIG. 4, with continuing reference to FIG. 3, the component 160 defines one or more cooling (or internal) cavities 168 in a thickness of the airfoil section 162A. Each of the cavities 168 can be fluidly coupled to a cooling source CS (shown in dashed lines for illustrative purposes). The cavities 168 can be fluidly isolated or can be interconnected by one or more crossover passages 169. One or more cavities 168 can serve as feeding cavities (e.g., indicated at 168-1) for receiving cooling flow F from the coolant source CS, and one or more cooling cavities 168 can serve as impingement cavities (e.g., indicated at 168-2, 168-3), for example.

The airfoil 162 defines one or more cooling passages (or meters) 170 for cooling portions of the component 160. At least some of the cooling passages 170 are defined in the external walls 162E (other exemplary locations of passages 170' shown in dashed lines for illustrative purposes).

Each cooling passage 170 includes an intermediate section 170S extending between an inlet port 170PI and an outlet port 170PO. The inlet port 170PI can be established along an internal wall surface 162SI bounding the respective internal cavity 168. In examples, at least some of the inlet ports are fluidly coupled to different internal cavities, as illustrated by two sets of inlet ports 270PI' coupled to respective cavities 268' in FIG. 10.

Each outlet port 170PO is coupled to a respective diffuser (or diffusion section) 170D. Each diffusor 170D extends outwardly from the respective outlet port 170PO and is dimensioned to convey diffused cooling flow F to various portions of the component 160 during operation, such as along an external wall surface 162SE of an external wall 162E of the component 160 to provide film cooling augmentation, for example. The inlet and outlet ports 170PI, 170PO and passages 170 can have various geometries, such as a generally rectangular geometry (see, e.g., FIGS. 5 and 7-8) or a generally elliptical geometry (see, e.g., FIGS. 11 and 14).

Two or more adjacent diffusers 170D partially overlap or are conjoined to establish one relatively larger composite diffuser including a common or effective diffuser region 172, as illustrated in FIG. 3. Each adjacent diffuser 170D is fluidly coupled to one common or effective outlet 174. The common diffuser region 172 is dimensioned to interconnect the diffusers 170D and the common outlet 174 such that all of the inlet ports 170PI of the cooling passages 170 are fluidly coupled to the common outlet 174.

The common outlet 174 can be defined at various positions of the component 160 to provide cooling augmentation including along the airfoil section 162A and/or platforms 162B, 162C of FIG. 3, for example. In the illustrative example of FIGS. 3-4, the common outlet 174 is established along the external wall surface 162SE and is arranged to eject diffused cooling flow F outwardly to provide film cooling augmentation to adjacent portions of the component 160. The component 160 can include a plurality of common outlets 174 arranged in a row (e.g., at least partially axially aligned in the chordwise direction X) along the external wall surface 162SE, as illustrated in FIG. 3.

Various techniques can be utilized to establish the cooling arrangements disclosed herein. For example, the common diffuser regions and common outlets can be formed by casting and electrode plunging techniques. Other example techniques include laser oblation, waterjet and other machining techniques.

Figure 5:
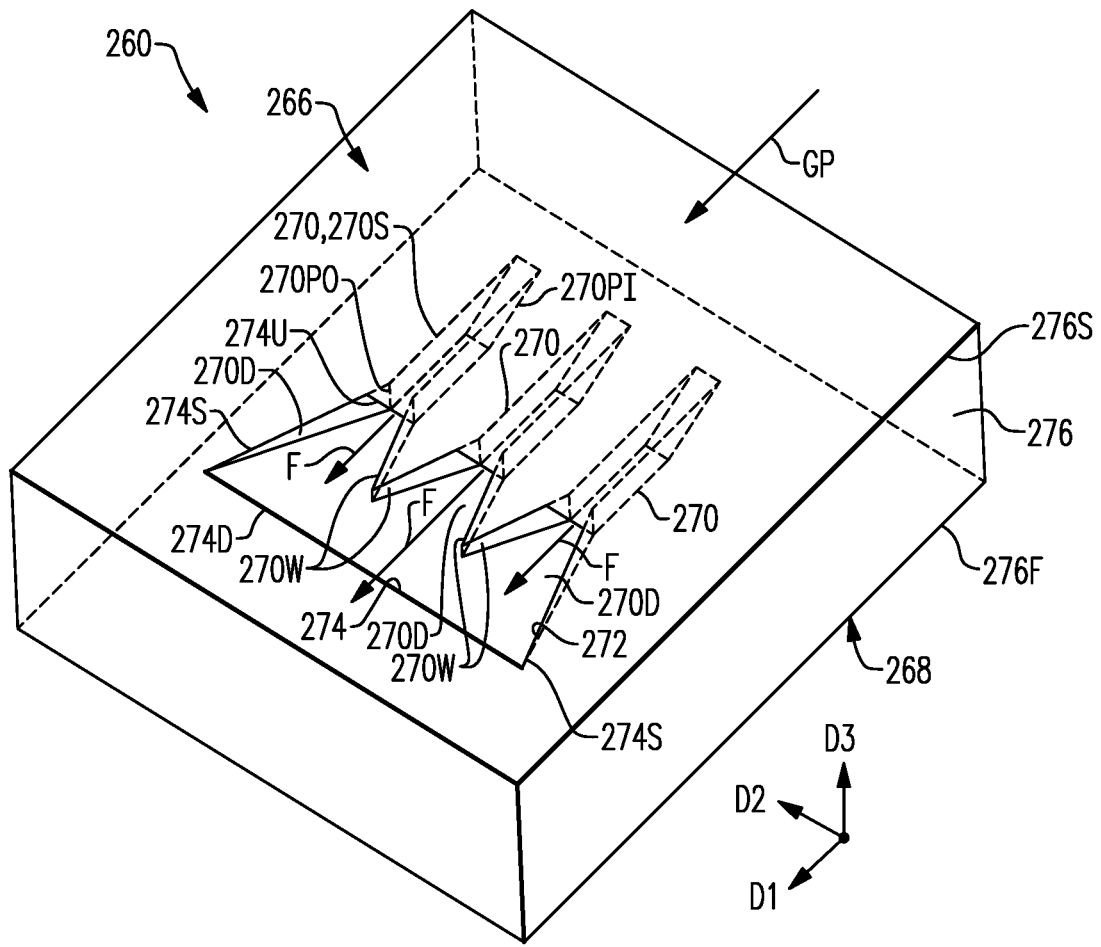
FIG. 5 illustrates a perspective view of a component including a cooling arrangement according to another example.
Figure 6:
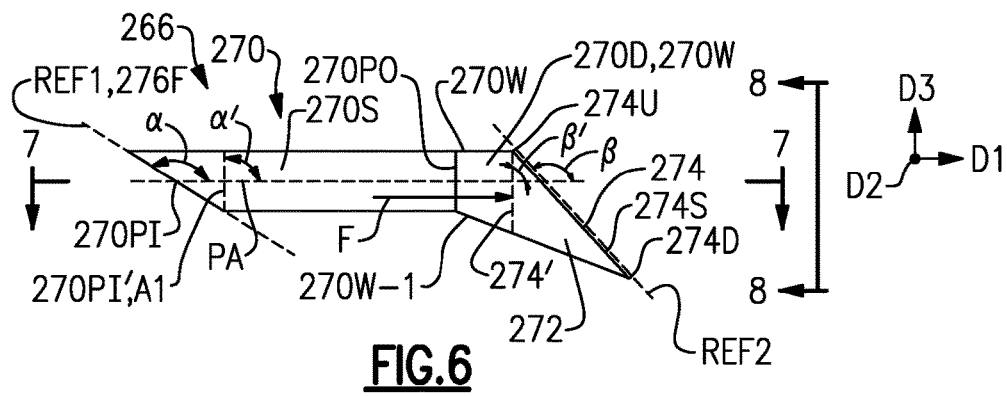
FIG. 6 illustrates a sectional view of the cooling arrangement of FIG. 5.
Figure 7:
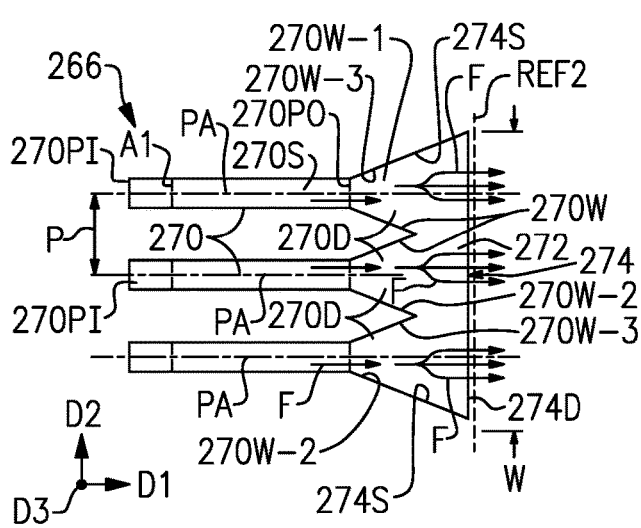
FIG. 7 illustrates a sectional view taken along line 7-7 of FIG. 6.
Figure 8:
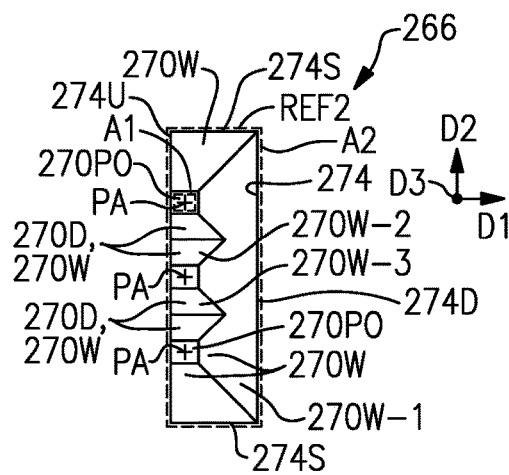
FIG. 8 illustrates an end view taken with respect to line 8-8 of FIG. 6.
Figure 9:
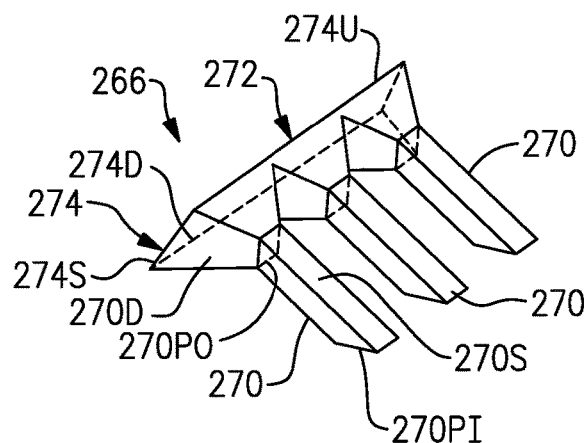
FIG. 9 illustrates a perspective view of a volume of the cooling arrangement of FIG. 5.

FIG. 5 illustrates a perspective view of a gas turbine engine component 260 including a cooling arrangement 266. FIGS. 6-8 illustrate side, section and end views of the cooling arrangement 266. FIG. 9 illustrates a perspective view of a volume of the cooling arrangement 266. The component 260 includes a wall 276 that extends in a first direction D1, a second direction D2, and a third (e.g., thickness) direction D3 perpendicular to each other. The wall 276 extends in the third direction D3 between a first wall surface 276F and an opposed second wall surface 276S. The first wall surface 276F can bound an internal cavity 268. In examples, the internal cavity 268 is one of the cavities 168 bounded by the external wall 162E along the internal wall surface 162SI of FIG. 4. In examples, the wall 276 is a portion of the external wall 162E of the component 160 of FIG. 4, the first wall surface 276F is a portion of the internal wall surface 162SI, and the second wall surface 276S is a portion of the external wall surface 162SE. The second wall surface 276S can be incorporated into the external wall surface 162SE of the airfoil section 162A or another portion of the component 160.

The wall 276 includes a plurality of cooling passages 270 and a plurality of diffusers 270D distributed in the second direction D2. The wall 276 can include a row of at least three cooling passages 270 and a row of at least three diffusers 270D, as illustrated by FIGS. 5 and 7. Fewer or more than three cooling passages 270 and diffusers 270D can be utilized, such as only two or four or more cooling passages 270 and diffusers 270D. In the illustrative example of FIG. 5, the diffusers 270D are aligned in a linear row relative to the direction D1. It should be appreciated that the diffusers 260D can be at least partially axially offset relative to the direction D1 to establish a cascade, such as along a generally arcuate profile or a generally diagonal profile (see, e.g., FIG. 26).

Each of the cooling passages 270 includes an intermediate section 270S extending generally in the first direction D1 between an inlet port 270PI and an outlet port 270PO coupled to a respective diffusors 270D. The inlet port 270PI is coupled to the internal cavity 268 along the first wall surface 276F. A perimeter of the intermediate section 270S is bounded by a thickness of the wall 276 such that adjacent cooling passages 270 are fluidly isolated from each other between the inlet and outlet ports 270PI, 270PO.

Referring to FIGS. 6-7, with continuing reference to FIG. 5, the intermediate section 270S of the cooling passage 270 extends along a respective passage axis PA between the inlet port 270PI and outlet port 270PO. A projection of the passage axis PA intersects a volume of the respective diffusors 270D. The passage axis PA can be linear or can be non-linear including one or more arcuate or curved segments, for example. The cooling passages 270 can be dimensioned to have substantially the same length as illustrated in FIG. 7, or can be dimensioned to have different lengths such that the inlet ports are axially staggered as illustrated by the passages 570 and respective inlet ports 570PI of FIG. 18.

The cooling passages 270 cooperate to interconnect the internal cavity 268 and a common outlet 274 along the second wall surface 276S. The common outlet 274 can extend in the first direction D1 and with respect to a general direction of flow in gas path GP between an upstream edge 274U and an opposed downstream edge 274D, and can extend in the second direction D2 between a pair of opposed sidewalls 274S, as illustrated by FIG. 5 (see also FIGS. 7-9).

The passage axes PA of adjacent cooling passages 270 can be substantially parallel or transverse to each other. In the illustrative example of FIG. 7, the passage axes PA of all of the cooling passages 270 that are coupled and convey cooling flow F to the common outlet 274 are substantially parallel to each other. For the purposes of this disclosure, the terms "substantially," "about," and "approximately" mean within ±3% of the stated value or relationship unless otherwise indicated.

The cooling passages 270 can be arranged at various orientations relative to the first wall surface 276F and second wall surface 276S. The inlet ports 270PI are established along a first reference plane REF1 extending along the first wall section 276F (shown in dashed lines in FIG. 6 for illustrative purposes). The common outlet 274 is established along a second reference plane REF2 (shown in dashed lines in FIGS. 6-8 for illustrative purposes). A projection of the passage axis PA of at least some, or each, of the passages 270 can intersect the second reference plane REF2, as illustrated by FIGS. 6-8. A projection of the passage axis PA can intersect the first and second reference planes REF1, REF2 at various angles α, β (FIG. 6). The angles α, β can be perpendicular or non-perpendicular values. The angles α, β can be the same or can differ from each other and/or from the angles α, β of other cooling passage 270 that convey flow F to the common outlet 274.

In the illustrative example of FIG. 6 (see also FIG. 5), each cooling passage 270 is arranged such that the angle α established by the passage axis PA is non-orthogonal to the first reference plane REF1, and such that the angle β established by the passage axis PA is non-orthogonal to the second reference plane REF2. In examples, the angles α, β are between approximately 120 to 170 degrees, or more narrowly less than or equal to approximately 150 degrees. In other examples, the angle α and/or angle β are approximately 90 degrees (illustrated in dashed lines by inlet and outlet ports 270PI', 270PO' and respective angles α', β' in FIG. 6).

Each diffuser 270D includes sidewalls 270W sloping away or otherwise extending outwardly from the outlet port 270PO of the respective cooling passage 270 towards the common outlet 274. At least some of the sidewalls 270W can be dimensioned to extend along or toward the sidewalls 274S, upstream edge 274U and/or downstream edge 274D of the common outlet 274. For example, opposed sidewalls 270W of an outermost pair of the diffusers 270D can be dimensioned to establish at least a portion of the sidewalls 274S of the common outlet 274, as illustrated in FIGS. 7 and 8. Sidewalls 270W of each diffuser 270D can be dimensioned to extend to the upstream edge 274U and/or downstream edge 274D of the common outlet 274, as illustrated by FIGS. 6 and 8.

In the illustrative example of FIGS. 6-8, three of the sidewalls 270W of the diffuser 270D each slope between approximately 5 and 15 degrees away from the respective outlet port 270PO with respect to the first, second and third directions D1-D3, respectively (indicated at 270W-1, 270W-2, 270W-3). In examples, the sidewalls 270W-1, 270W-2, 270W-3 each slope approximately 10 degrees away from the respective outlet port 270PO, which may generally be referred to as a "10-10-10" arrangement.

The diffusers 270D are conjoined to establish a common diffuser region 272 interconnecting the diffusers 270D and the common outlet 274. The diffusers 270D are dimensioned to convey at least a portion of diffused cooling flow F from the cooling passages 270 to the common diffuser region 272 and then outwardly through the common outlet 274 (FIGS. 6-7). The common diffuser region 272 is dimensioned to interconnect the diffusers 270D and common outlet 274.

Figure 10:
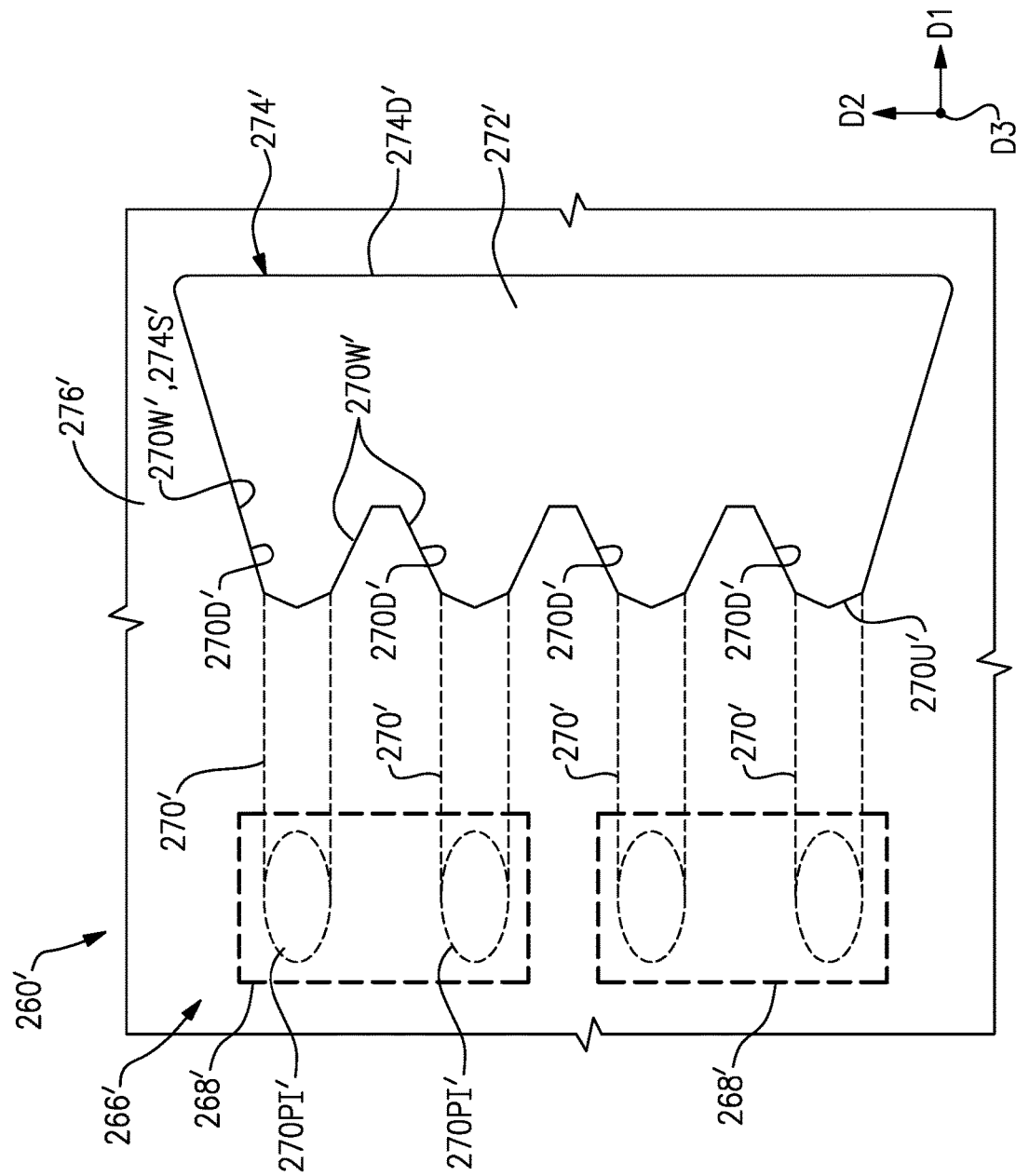
FIG. 10 illustrates a plane view of a component including a cooling arrangement according to another example.

Sidewalls 270W of at least two adjacent diffusors 270D merge or are conjoined to establish the common diffuser region 272 and the common outlet 274 along the second wall surface 276S, as illustrated in FIGS. 5 and 7-8. In the illustrative example of FIGS. 5 and 7, three adjacent diffusors 270D are conjoined to establish the common outlet 274. Fewer or more than three diffusors 270D can be conjoined to establish the common outlet 274, such as two diffusers or four diffusors 270D' as illustrated in FIG. 10.

The downstream edge 274D of the common outlet 274 can have various geometries to convey cooling flow F to targeted regions along the second wall surface 276S. In the illustrative example of FIGS. 5 and 7-8, the downstream edge 274D is substantially linear to convey relatively uniform diffused cooling flow F from the common diffuser region 272 downstream along the second wall surface 276S.

The cooling passages 270 and common outlet 274 can be dimensioned relative to each other to establish a relatively compact cooling arrangement 266 that facilitates sufficient structural support. Referring to FIG. 7, the passage axes PA of adjacent inlet ports 270PI establish a pitch P. The pitch P of adjacent pairs of passage axes PA can be the same or can differ. The sidewalls 274S of the common outlet 274 establish a maximum width W. A pitch ratio can be established as the pitch P of adjacent inlet ports 270PI to the maximum width W of the common outlet 274. In examples, the pitch ratio is equal to or greater than 0.10, or more narrowly is less than or equal to 0.40, such as between 0.20 and 0.30, for each or at least one adjacent pair of inlet ports 270PI that convey cooling flow F to the common outlet 274. An average pitch ratio can be established as an average of the pitch P of all of the inlet ports 270PI to the maximum width W of the common outlet 274. In examples, the average pitch ratio is equal to or greater than 0.10, or more narrowly is less than or equal to 0.40. In examples, the average pitch ratio is greater than or equal to 0.15.

The cross-sectional areas of the cooling passages 270 and common outlet 274 can be dimensioned to establish a relatively compact cooling arrangement 266. Each of the cooling passages 270 has a minimum cross-sectional area A1 at a position along a length of the passage axis PA that establishes a throat (A1 shown in dashed lines in FIGS. 6-8). The throat is dimensioned to restrict or meter flow F through the cooling passage 270 to the respective diffuser 270D. The minimum cross-sectional area A1 can be establishes at various positions. In examples, the minimum cross-sectional area A1 is established along the first wall surface 276F. In other examples, the minimum cross-sectional area A1 is established a distance from the first wall surface 276F with respect to the passage axis PA, as illustrated by FIG. 6. A total of the minimum cross-sectional area A1 of all of the cooling passages 270 that convey flow F to the common outlet 274 establishes a combined cross-sectional area.

The common outlet 274 establishes an outlet cross-sectional area A2 (shown in dashed lines in FIG. 8) along the second wall surface 276S. An area ratio of the combined cross-sectional area of the areas A1 to the outlet cross-sectional area A2 can be established. In examples, the area ratio is equal to or greater than 0.15, or more narrowly is less than or equal to 0.40. In examples, the area ratio is greater than or equal to 0.20 and is less than or equal to 0.30. The disclosed area ratios can be utilized to establish sufficient velocities of diffused cooling flow F ejected by the common outlet 274 during operation.

Referring to FIGS. 6-7, the cooling arrangement 266 can operate as follows. Cooling flow F is communicated from the internal cavity 268 to the cooling passages 270. The cooling flow F is communicated from the cooling passages 270 to the respective diffusers 270D. Diffused cooling flow F is conveyed by the diffusers 270D to the common diffusor region 272. The diffused cooling flow F in the common diffusor region 272 at least partially mixes and is then ejected from the common outlet 274 and into the gas path GP to provide film cooling augmentation to the second wall surface 276S.

Figure 11:
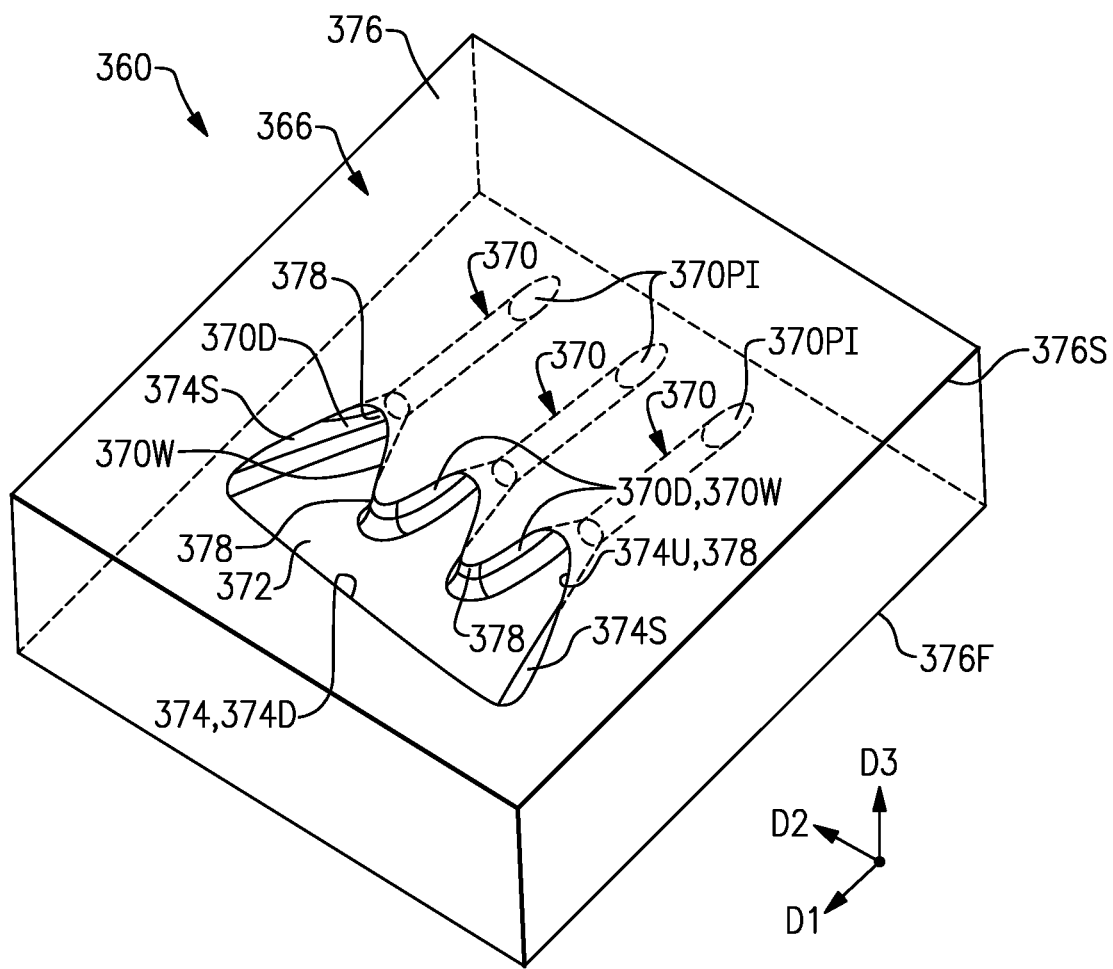
FIG. 11 illustrates a perspective view of a component including a cooling arrangement according to another example.
Figure 16:
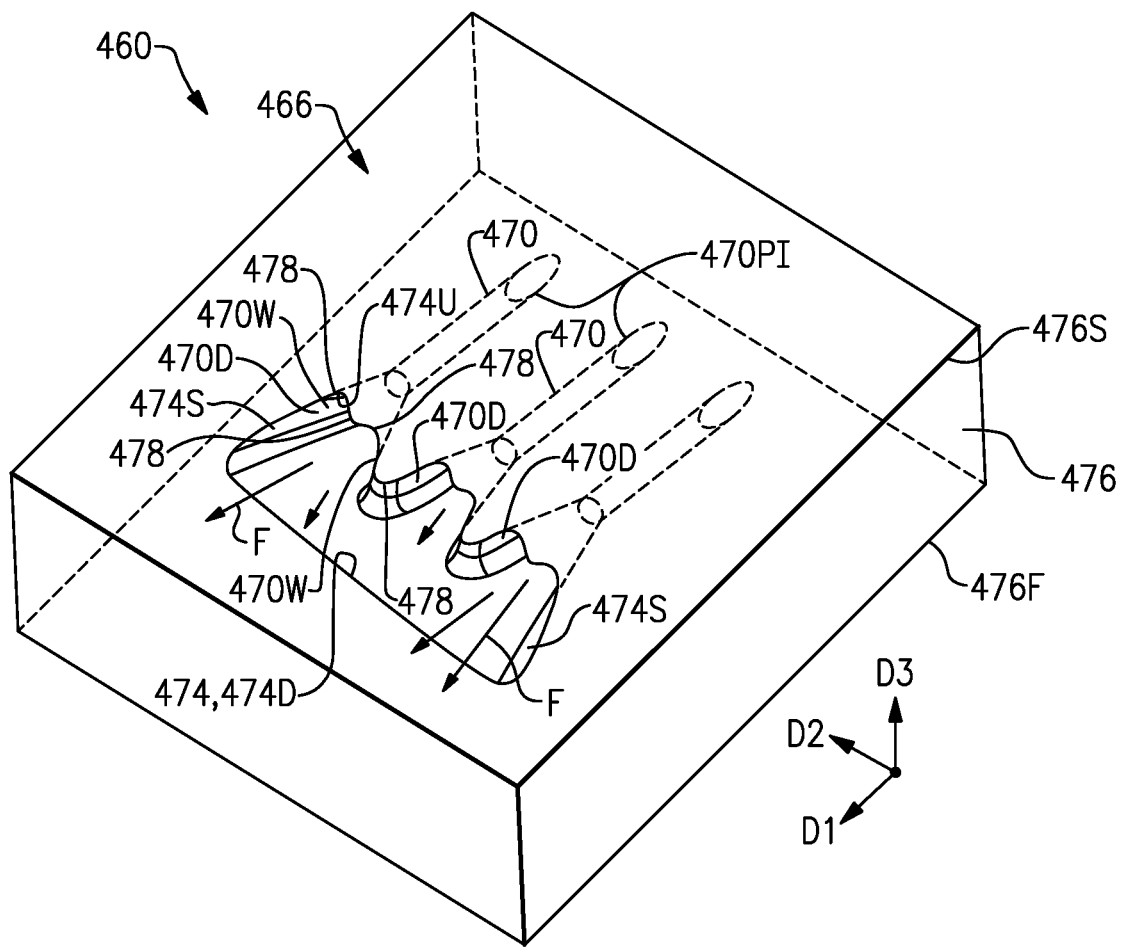
FIG. 16 illustrates a perspective view of a component including a cooling arrangement according to another example.

FIGS. 11-15 illustrate a gas turbine engine component 360 according to another example. Cooling arrangement 366 includes a plurality of cooling passages 370 extending along respective passage axes PA (FIGS. 12-14). The cooling passages 370 are fluidly coupled to a common outlet 374 via a common diffuser region 372 established by conjoined diffusers 370D. The common outlet 374 is established along a second reference plane REF2 (shown in dashed lines in FIGS. 14-15 for illustrative purposes). Sidewalls 370W of the diffusers 370D are contoured to establish a relatively continuous transition with the sidewalls 370W of adjacent diffusers 370D and/or sidewalls 374S of the common outlet 374, as illustrated by FIGS. 11 and 13-14. The diffusers 370D can be dimensioned such that an upstream edge 374U of the common outlet 374 has a generally sinusoidal or waveform profile including a plurality of undulations 378 forming alternating peaks and valleys, as illustrated by FIGS. 11 and 16. The common outlet 374 can be dimensioned such that at least some of the undulations 378 are substantially aligned with a projection of a respective passage axis PA projected onto the second reference plane REF2, as illustrated by FIG. 15.

Figure 17:
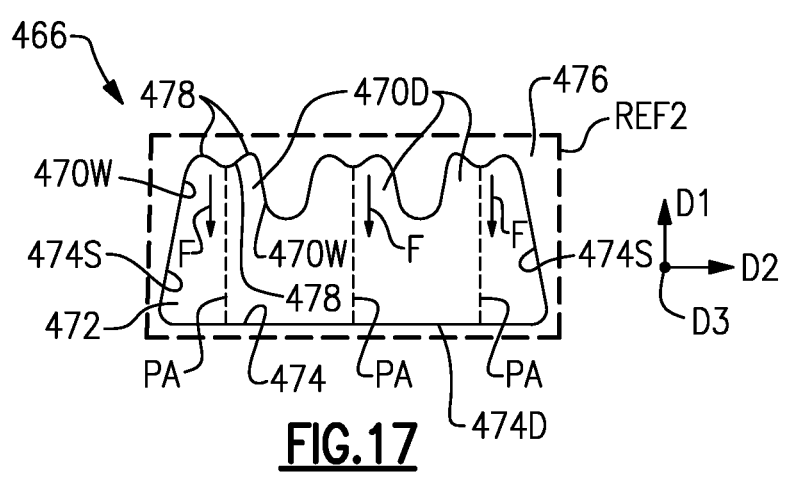
FIG. 17 illustrates a plane view of the cooling arrangement of FIG. 16.

In the illustrative example of FIGS. 16-17, a common outlet 474 is dimensioned such that a plurality of undulations 478 are established along an upstream edge 474U. The upstream edge 474U includes three undulations 478 between opposed sidewalls 470W of each diffuser 470D such that a total number of the undulations 478 along the upstream edge 474U is greater than a total number of the diffusers 470D that convey cooling flow to the common outlet 474. Each diffuser 470D can be associated with one undulation 478 substantially aligned with a projection of a respective passage axis PA onto a second reference plane REF2 and at least two undulations 478 can be offset from the projection of the respective passage axis PA, as illustrated in FIG. 17.

The downstream edge of the common outlet can have various geometries. In the illustrative example of FIG. 16-17, the downstream edge 474D has a substantially linear or curvilinear geometry. Other geometries of the downstream edge can be utilized.

Figure 18:
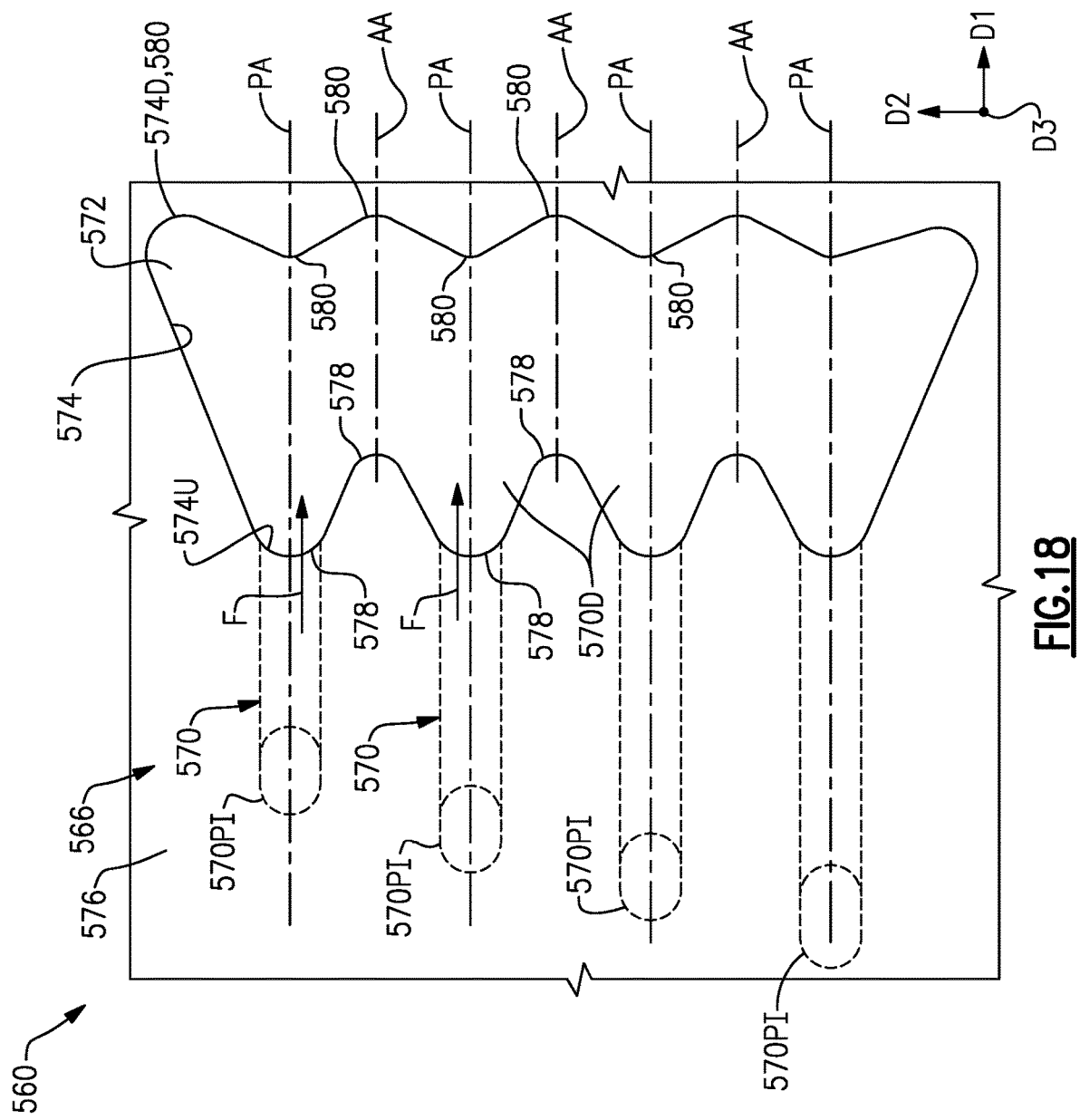
FIG. 18 illustrates a plane view of a component including a cooling arrangement according to another example.

FIG. 18 illustrates a gas turbine engine component according to another example. A downstream edge 574D of common outlet 574 has a generally sinusoidal or waveform profile including a plurality of undulations 580 establishing alternating peaks and valleys. At least some of the undulations 580 can be substantially axially aligned with a projection of a respective passage axis PA. One or more undulations 578, 580 can be axially aligned along a respective axis AA having a major component extending in a first direction D1. In the illustrative example of FIG. 18, the axes AA are parallel to each other and to each of the passage axes PA. In other examples, at least some of the axes AA, PA are transverse to each other.

Figure 19:
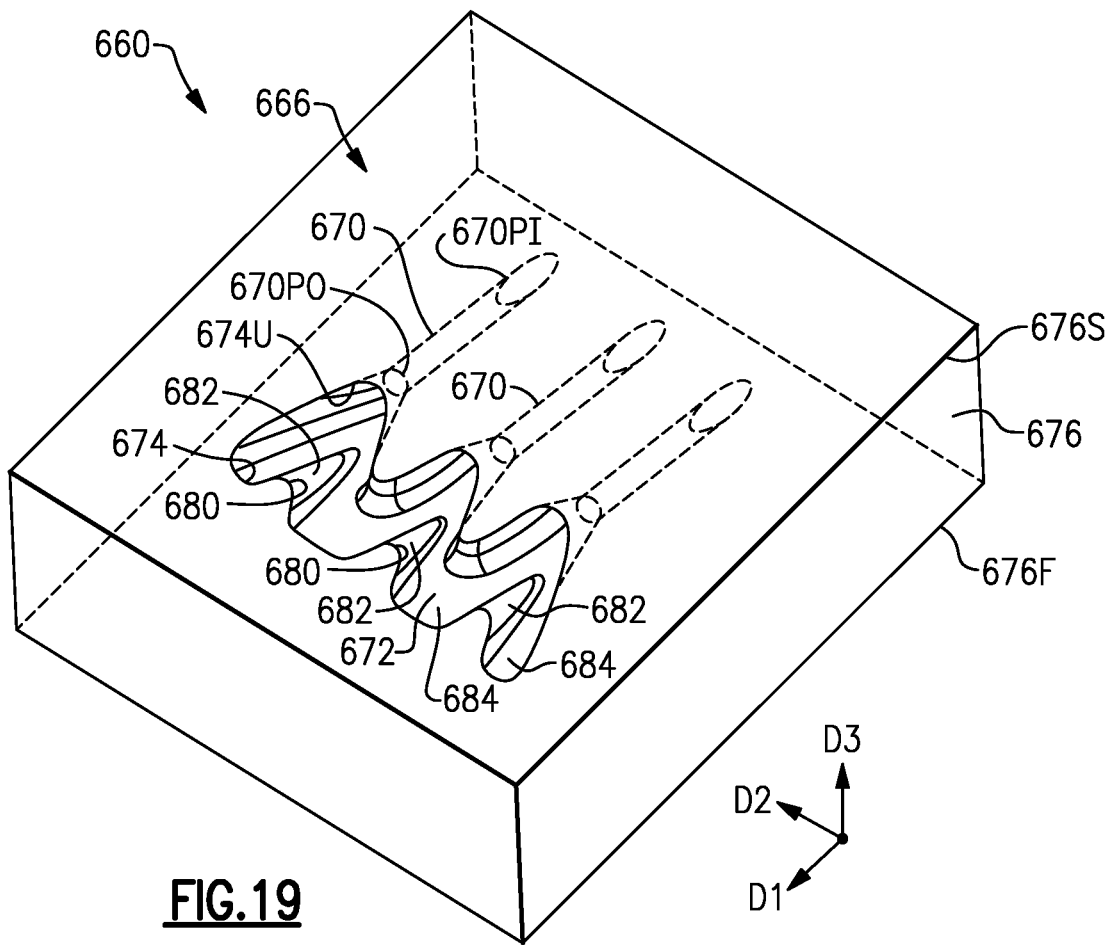
FIG. 19 illustrates a perspective view of a component including a cooling arrangement according to another example.
Figure 20:
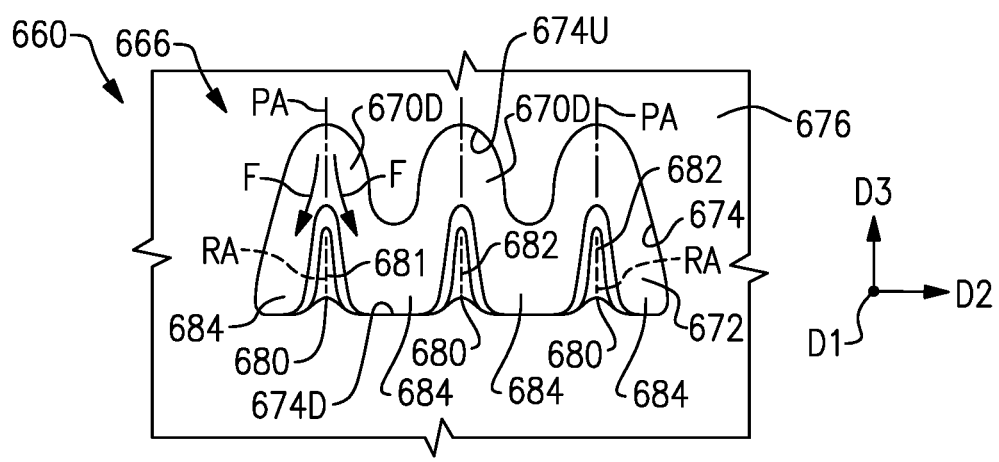
FIG. 20 illustrates a plane view of the cooling arrangement of FIG. 19.
Figure 21:
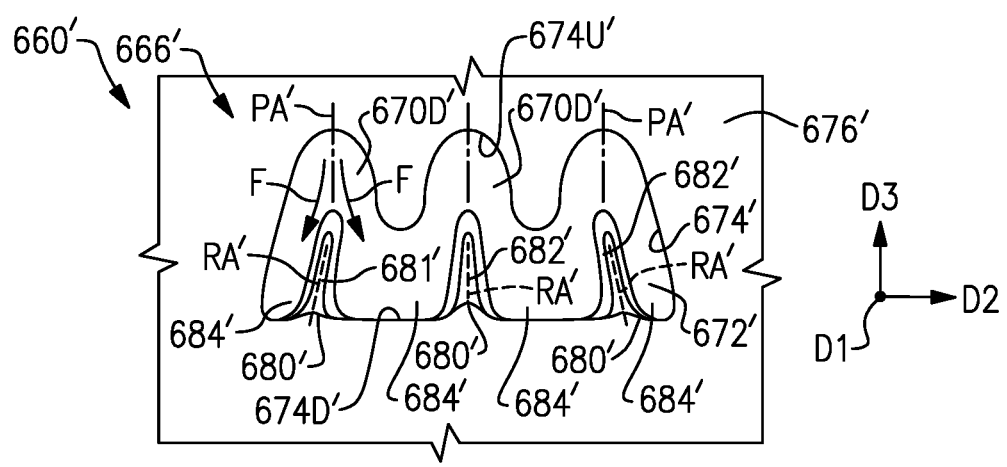
FIG. 21 illustrates a plane view of an example cooling arrangement.

In the illustrative example of FIGS. 19-20, a common diffusor region 672 includes one or more ridges 682 extending in a first direction D1 from respective undulations 680 along a downstream edge 674D of a common outlet 674. Each ridge 682 extends along a respective ridge axis RA. Each ridge 682 can establish one or more adjacent lobes 684. The ridges 682 can be utilized to direct or guide diffused cooling flow F from the diffusors 470D towards localized regions of the common diffusor region 672. An orientation of the ridge axes RA of the ridges 682 can be the same as illustrated in FIG. 20, or can differ as illustrated by ridges 682' of FIG. 21. The ridge axis RA of each ridge 682 can be substantially axially aligned with a projection of a respective passage axis PA, as illustrated by FIG. 20. In other examples, one or more of the ridges 682 are transverse to a projection a projection of the respective passage axis PA as illustrated by an outer pair of ridges 682' in FIG. 21, which may be utilized to provide targeted cooling augmentation while maintaining a distance between the outlet ports 680PO (FIG. 19). Arranging the undulations 680 and ridges 682 according to the teachings disclosed here can provide relatively uniform cooling augmentation along surfaces of the common diffuser region 672 and can reduce thermal gradients in adjacent portions of a wall 676 of the component 660.

Other cooling passage arrangements can be utilized. In the illustrative example of FIG. 22, cooling arrangement 766 includes a plurality of cooling passages 770 distributed in a second direction D2 in a wall 767 of component 760. Each of the cooling passages 770 extends along a passage axis PA between an inlet port 770PI and outlet port 770PO. The cooling passages 770 are coupled to a common outlet 774 via a common diffusor region 772 at the outlet ports 770PO.

Figure 22:
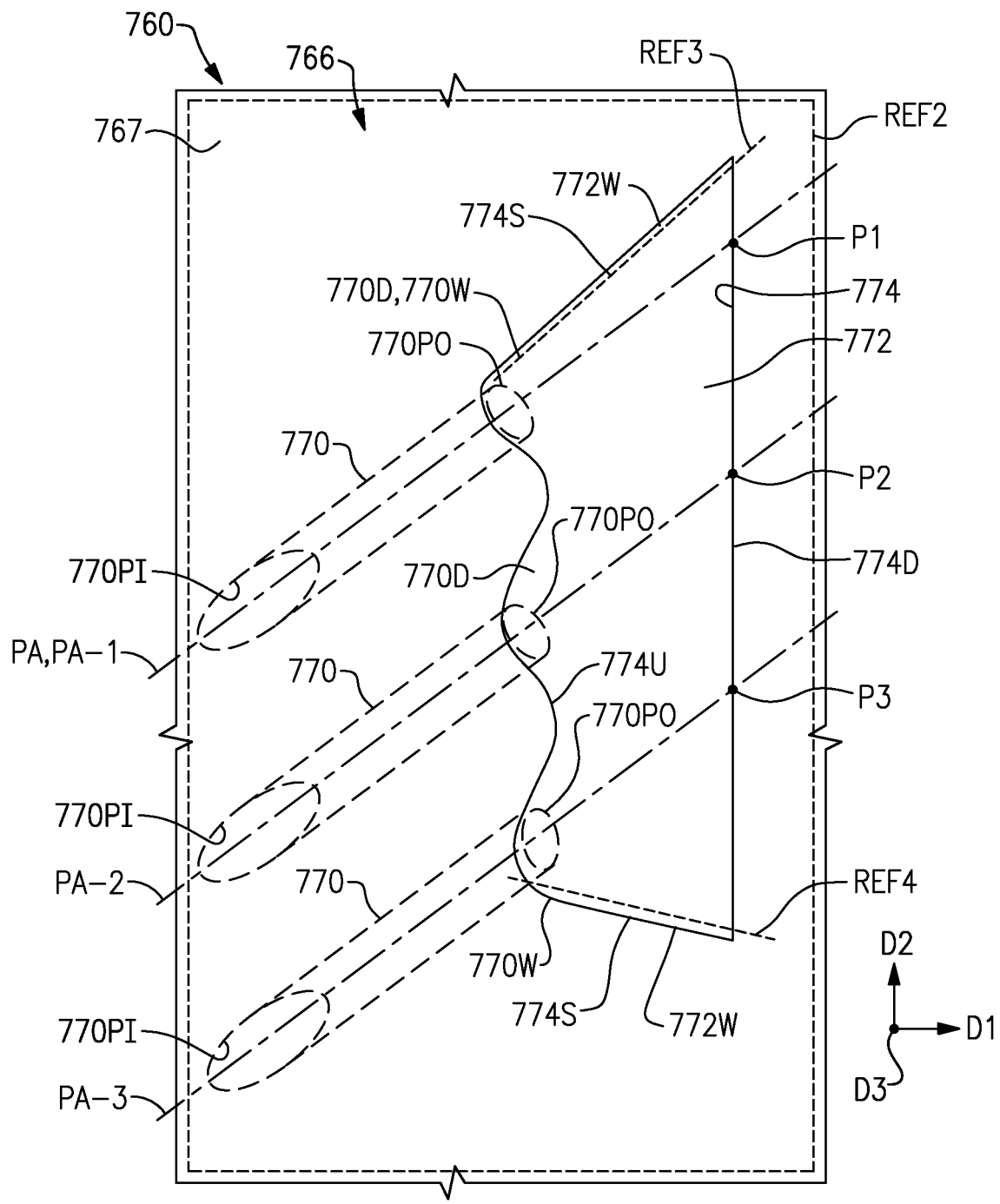
FIG. 22 illustrates a plane view of a component including a cooling arrangement according to another example.

The passages 770 can be arranged such that the inlet ports 770PI are at least partially aligned in the directions D1 and/or D3, as illustrated in FIG. 22.

The cooling passages 770 are arranged such that the inlet port 770PI of at least one (or all) of the cooling passages 770 is offset from the respective outlet port 770PO with respect to the second direction D2, which can increase convective cooling augmentation by increasing a length of the passages 770 in the wall 776. A projection of the cooling passages 770 onto a second reference plane REF2 can transversely intersect a projection of a downstream edge 774D of the common outlet 774 onto the second reference plane REF2 at respective points P1-P3, as illustrated by FIG. 22. The cooling passages 770 can be arranged such that the passage axes PA are substantially parallel to each other, as illustrated by passage axes PA-1 to PA-3 in FIG. 22, or can be substantially transverse to each other. In examples, the first direction D1 and second direction D2 correspond to the chordwise and radial directions X, R of the component 160 of FIG. 3, and one or more (or all) of the cooling passages 770 are distributed such that each inlet port 770PI is offset from the respective outlet port 770PO with respect to the radial direction R. The passage axes PA can be arranged at approximately 15-75 degrees relative to the first direction D1, such as about 45 degrees as illustrated in FIG. 22.

Sidewalls 772W of the common diffuser region 772 extend along respective reference planes REF3, REF4 (shown in dashed lines for illustrative purposes). The projection of the passage axis PA of at least one of the cooling passages 770 can be substantially parallel to the reference plane REF3 and respective sidewalls 772W, 774S, as illustrated by passage axis PA-1. The projection of the passage axis PA of at least one of the cooling passages 770 can be substantially transverse to the reference plane REF4 and respective sidewalls 772W, 774S, as illustrated by passage axis PA-3. Angles of the reference planes REF3, REF4 can be established at the same or different absolute values relative to an axis extending the first direction D1. The arrangement of the passage axes PA relative to the sidewalls 772W of the common diffuser region 772 can be utilized to provide targeted (e.g., relatively lesser or greater) amounts of convective cooling augmentation along surfaces of the common diffuser region 772.

Figure 23:
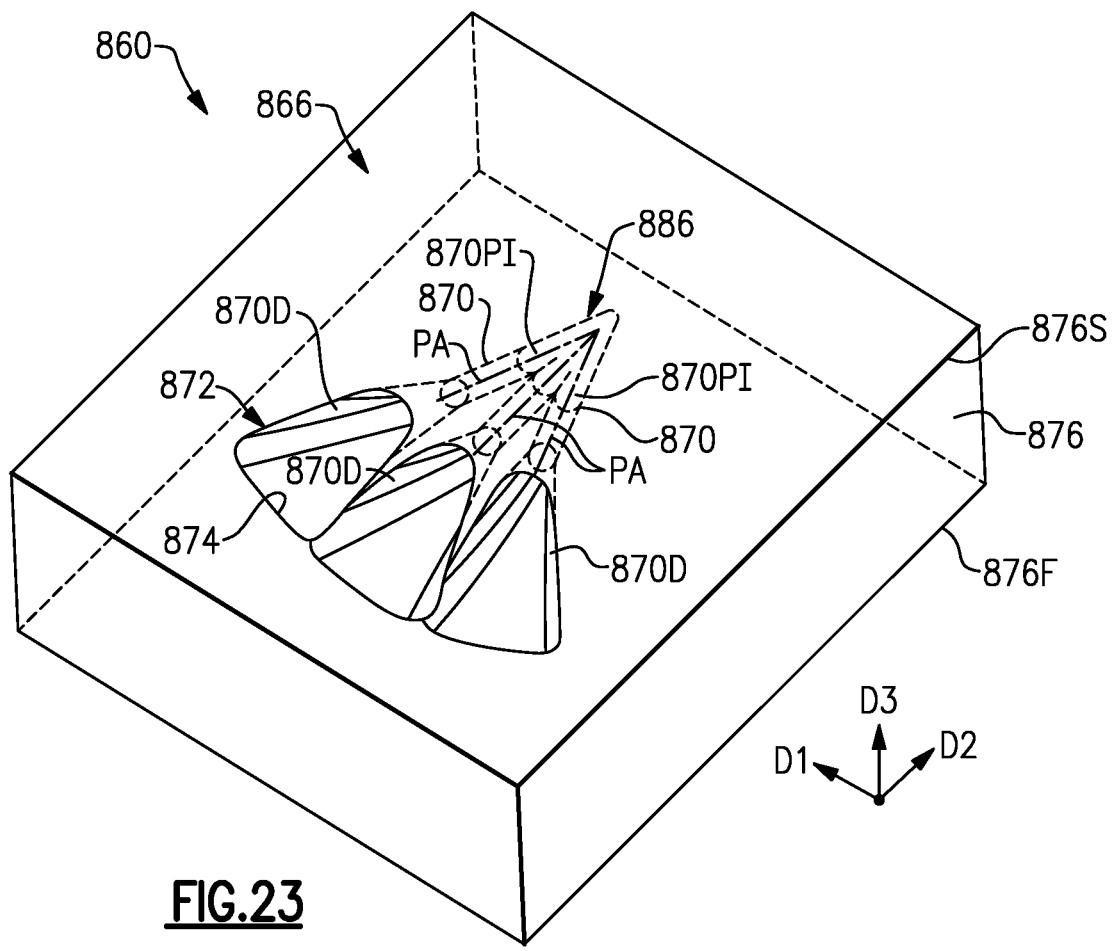
FIG. 23 illustrates a perspective view of a component including a cooling arrangement according to another example.

FIG. 23 illustrates a gas turbine engine component 860 according to another example. Cooling arrangement 866 includes a plurality of cooling passages 870 in a wall 876. The cooling arrangement 866 can include three or more cooling passages 870 as illustrated by FIG. 23. The cooling passages 870 include respective diffusers 870D that are conjoined to establish a common diffuser region 872. The common diffuser region 872 interconnects the cooling passages 870 and a common outlet 874.

Figure 24:
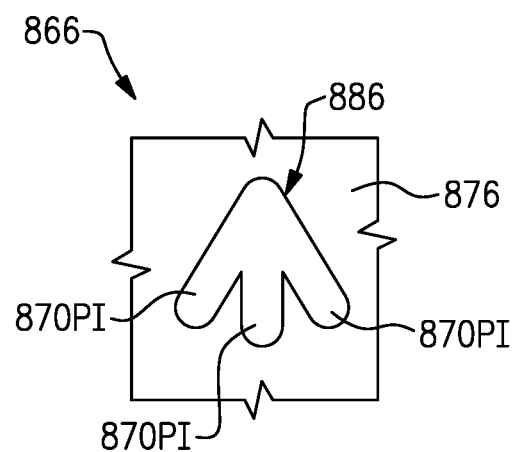
FIG. 24 illustrates an end view of a portion of the cooling arrangement of FIG. 23.

Passage axes PA of the cooling passages 870 can be arranged at various orientations to provide targeted convective cooling augmentation to adjacent portions of the wall 876. For example, the passage axes PA of at least two (or all) of the cooling passages 870 can be transversely arranged relative to each other, as illustrated in FIG. 23. The inlet ports 870PI of the at least two (or all) of the cooling passages 870 can at least partially overlap or be conjoined to establish one common or effective inlet 886, as illustrated by FIGS. 23-24. In the illustrative example of FIGS. 23-24, the inlet ports 870PI of all three cooling passages 870 are conjoined to establish the common inlet 886. A throat or minimum cross-sectional area of the cooling passages 870 can established at the common inlet 886 or at a position along the respective passage axes PA spaced apart from the respective inlet port 870PI.

Each diffusor 870D is aligned along a respective passage axis PA. The cooling passages 870 can extend outwardly from the common inlet 886 such that the diffusors 870D are arranged in a fanned array, as illustrated by FIG. 23.

Figure 25:
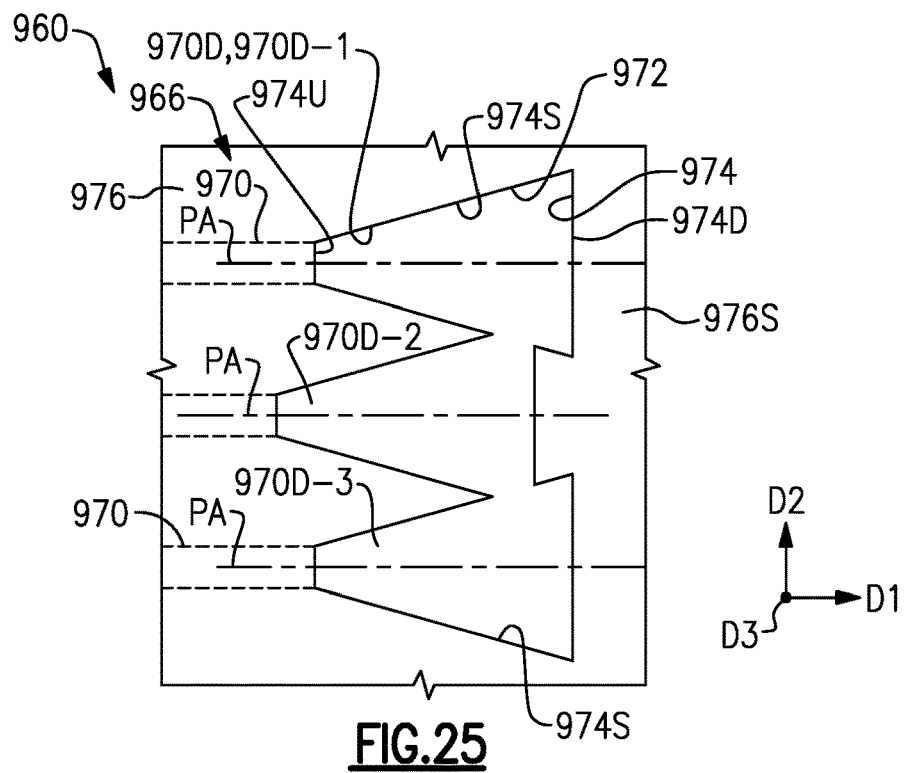
FIG. 25 illustrates a plane view of a component including a cooling arrangement according to another example.

The diffusers can be arranged in a cascade along a second wall surface, such as the external wall surface 162SE of the component 160 of FIG. 3, to provide targeted film cooling augmentation to adjacent portions of the component 160. In the illustrative example of FIG. 25, a common outlet 974 extends in a first direction D1 between an upstream edge 974U and a downstream edge 974D and extends in a second direction D2 between a pair of opposed sidewalls 974S. One or more diffusers 970D are offset from at least one adjacent diffuser 970D with respect to the first direction D1 such that the downstream edge 974D has a non-linear geometry. In the illustrative example of FIG. 25, a second diffuser 970D-2 is axially forward of adjacent diffusers 970-1, 970-3, and the diffusers 970-1, 970-3 are substantially aligned with respect to the first direction D1.

Figure 26:
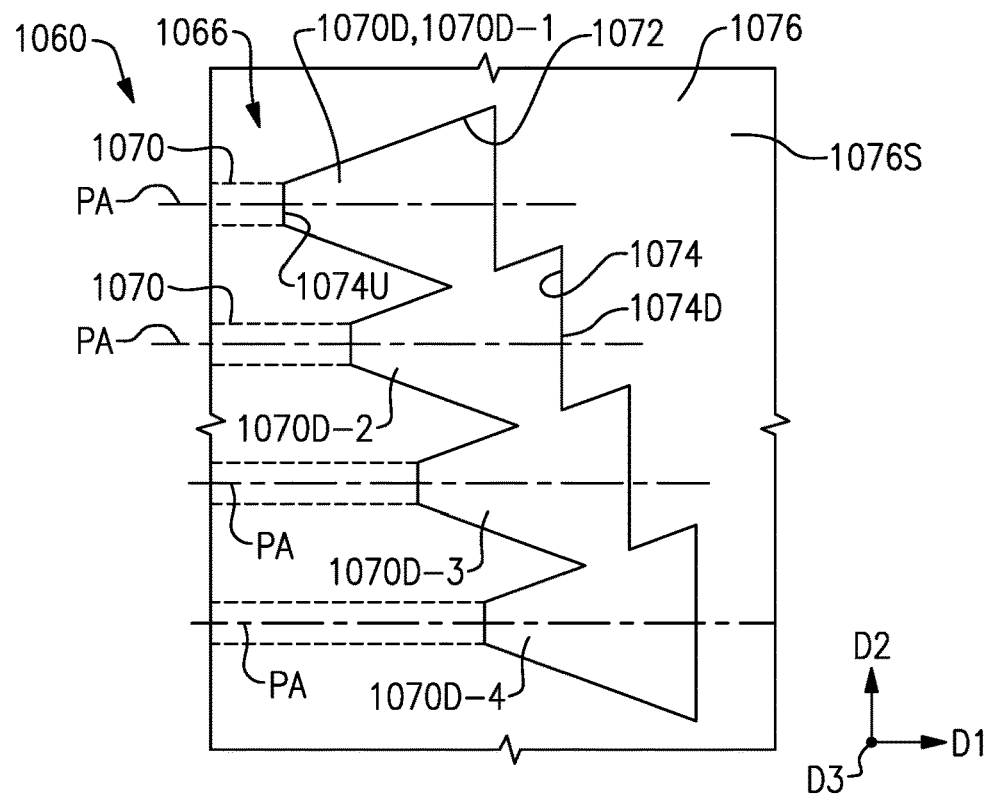
FIG. 26 illustrates a plane view of a component including a cooling arrangement according to another example.

In the illustrative example of FIG. 26, cooling arrangement 1066 of component 1060 includes a plurality of diffusers 1070D arranged in a cascade along a second wall surface 1076S of a wall 1076. The diffusers 1070D include four diffusers 1070D-1 to 1070D-4. Adjacent diffusers 1070D-1 to 1070D-4 are progressively offset in a first direction D1 to establish the cascade. A downstream edge 1074D of the common outlet 1074 can have a generally zig-zag geometry, as illustrated in FIG. 26. The downstream edge 1074D can have other geometries, such as a generally sinusoidal geometry that is substantially free of sharp transitions or stepwise geometry, for example. The cascade arrangement can provide targeted film cooling augmentation along the second wall surface 1076S which may reduce thermal gradients in the component 1060 that may otherwise occur due to temperature variations in the gas path. The first direction D1 can correspond to the chordwise direction X of FIGS. 3-4, for example. Alignment and offsetting of the diffusers can be determined with respect to a centroid of a plane of each respective diffuser projected onto a reference plane common with the common outlet.

The disclosed cooling arrangements can be utilized to provide sufficient structural support in combination with sufficient film cooling coverage to counteract high heat loads in the component during operation. The disclosed cooling arrangements can provide relatively higher film effectiveness, lower material temperatures, lower thru-thickness gradients, lower transient thermal gradients, and improved durability, and may be produced at a relatively lower cost.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A gas turbine engine component comprising:
a wall extending in a thickness direction between first and second wall surfaces, the first wall surface bounding an internal cavity, the wall including a plurality of cooling passages, each of the cooling passages extending in a first direction between an inlet port and an outlet port coupled to a respective diffuser, and the inlet port coupled to the internal cavity along the first wall surface;
wherein sidewalls of adjacent diffusers are conjoined to establish a common diffuser region interconnecting the diffusers and a common outlet along the second wall surface; and
wherein each of the cooling passages has a minimum cross-sectional area, a total of the minimum cross-sectional area of all of the cooling passages establishes a combined cross-sectional area, the common outlet establishes an outlet cross-sectional area, and an area ratio of the combined cross-sectional area to the outlet cross-sectional area is equal to or greater than 0.15, and the area ratio is less than or equal to 0.40.

2. The gas turbine engine component as recited in claim 1, wherein the plurality of cooling passages includes at least three cooling passages distributed in a second direction perpendicular to the first direction and the thickness direction.

3. The gas turbine engine component as recited in claim 2, wherein adjacent inlet ports establish a pitch, and a pitch ratio of an average of the pitch of the inlet ports to a maximum width of the common outlet is equal to or greater than 0.10, and the pitch ratio is less than or equal to 0.30.

4. The gas turbine engine component as recited in claim 3, wherein the cooling passages are arranged such that a projection of a passage axis of the respective cooling passage is non-orthogonal to a reference plane along the common outlet.

5. The gas turbine engine component as recited in claim 3, wherein the common outlet extends in the first direction between an upstream edge and a downstream edge and extends in the second direction between a pair of opposed sidewalls, and wherein the diffuser is offset from at least one adjacent diffuser with respect to the first direction such that the downstream edge has a non-linear geometry.

6. The gas turbine engine component as recited in claim 2, wherein the common outlet extends in the first direction between an upstream edge and a downstream edge and extends in the second direction between a pair of opposed sidewalls, and the downstream edge includes a plurality of undulations.

7. The gas turbine engine component as recited in claim 1, wherein the cooling passages are distributed in a second direction perpendicular to the first direction, and the inlet port of at least one of the cooling passages is offset from the respective outlet port with respect to the second direction.

8. The gas turbine engine component as recited in claim 7, wherein passage axes of all of the plurality of cooling passages coupled to the common outlet are parallel to each other.

9. The gas turbine engine component as recited in claim 8, wherein a projection of the passage axis of one of the plurality of cooling passages is substantially parallel to a sidewall of the common diffuser region.

10. The gas turbine engine component as recited in claim 7, wherein passage axes of at least two of the cooling passages are transversely arranged relative to each other.

11. The gas turbine engine component as recited in claim 10, wherein the inlet ports of the at least two cooling passages are conjoined to establish a common inlet.

12. The gas turbine engine component as recited in claim 1, wherein the gas turbine engine component is an airfoil comprising a ceramic matrix composite (CMC) material, the airfoil including an airfoil section extending from a platform, and the second wall surface is an external wall surface of the airfoil section.

13. A gas turbine engine comprising:
an array of blades and an array of vanes spaced axially from the array of blades in a gas path, the array of blades are rotatable in the gas path, and an array of blade outer air seals (BOAS) arranged about the array of blades to bound the gas path; and
wherein at least one of the array of blades, the array of vanes and the array of BOAS comprises:
an external wall between an internal wall surface and an external wall surface, the internal wall surface bounding an internal cavity;
a plurality of cooling passages in the external wall, each of the plurality of cooling passages including an intermediate section extending between an inlet port and an outlet port coupled to a respective diffuser, and the inlet port coupled to the internal cavity along the internal wall surface;
wherein the diffusers are conjoined to establish a common diffuser region interconnecting the diffusers and a common outlet along the external wall surface; and
wherein each of the cooling passages has a minimum cross-sectional area, a total of the minimum cross-sectional area of all of the cooling passages establishes a combined cross-sectional area, the common outlet establishes an outlet cross-sectional area, and an area ratio of the combined cross-sectional area to the outlet cross-sectional area is equal to or greater than 0.15, and the area ratio is less than or equal to 0.40.

14. The gas turbine engine as recited in claim 13, wherein adjacent inlet ports establish a pitch, a pitch ratio of an average of the pitch of the inlet ports to a maximum width of the common outlet is equal to or greater than 0.10, and the pitch ratio is less than or equal to 0.30.

15. The gas turbine engine as recited in claim 13, wherein the plurality of cooling passages includes three or more cooling passages distributed in a radial direction, and the diffusers are arranged in a chordwise direction to establish a cascade along the external wall surface such that the outlet ports are offset in the chordwise direction.

16. The gas turbine engine as recited in claim 13, wherein an airfoil section comprises the external wall, the airfoil section extends in a radial direction from a platform, and the cooling passages are distributed such that each inlet port is offset from the respective outlet port with respect to the radial direction.

17. A method of cooling a gas turbine engine component comprising:
- communicating cooling flow from an internal cavity to a plurality of cooling passages, the internal cavity bounded by an external wall of the gas turbine engine component, and each of the plurality of cooling passages coupled to an inlet port along an internal wall surface bounding the internal cavity;
- communicating the cooling flow from the cooling passages to a respective diffuser, wherein the diffusers are conjoined to establish a common diffuser region interconnecting the diffusers and a common outlet along an external wall surface of the external wall; and
- ejecting the cooling flow from the common outlet and into a gas path to provide film cooling augmentation to the external wall surface; and
- wherein each of the cooling passages has a minimum cross-sectional area, a total of the minimum cross-sectional area of all of the cooling passages establishes a combined cross-sectional area, the common outlet establishes an outlet cross-sectional area, and an area ratio of the combined cross-sectional area to the outlet cross-sectional area is equal to or greater than 0.15, and the area ratio is less than or equal to 0.40.

18. The method as recited in claim 17, wherein:
- the plurality of cooling passages includes three or more cooling passages;
- the diffusers are arranged in a cascade along the external wall surface; and
- adjacent inlet ports establish a pitch, a pitch ratio of an average of the pitch of the inlet ports to a maximum width of the common outlet is equal to or greater than 0.10, and the pitch ratio is less than or equal to 0.30.

19. The method as recited in claim 17, wherein an airfoil section comprises the external wall, the airfoil section extends in a radial direction from a platform, each of the cooling passages is coupled to the respective diffuser at a respective outlet port, and the cooling passages are distributed such that one or more of the inlet ports is offset from the respective outlet port with respect to the radial direction.

20. The method as recited in claim 17, wherein the plurality of cooling passages includes three or more cooling passages, and the inlet ports of the three or more cooling passages are conjoined to establish a common inlet.

* * * * *